Figure 1:
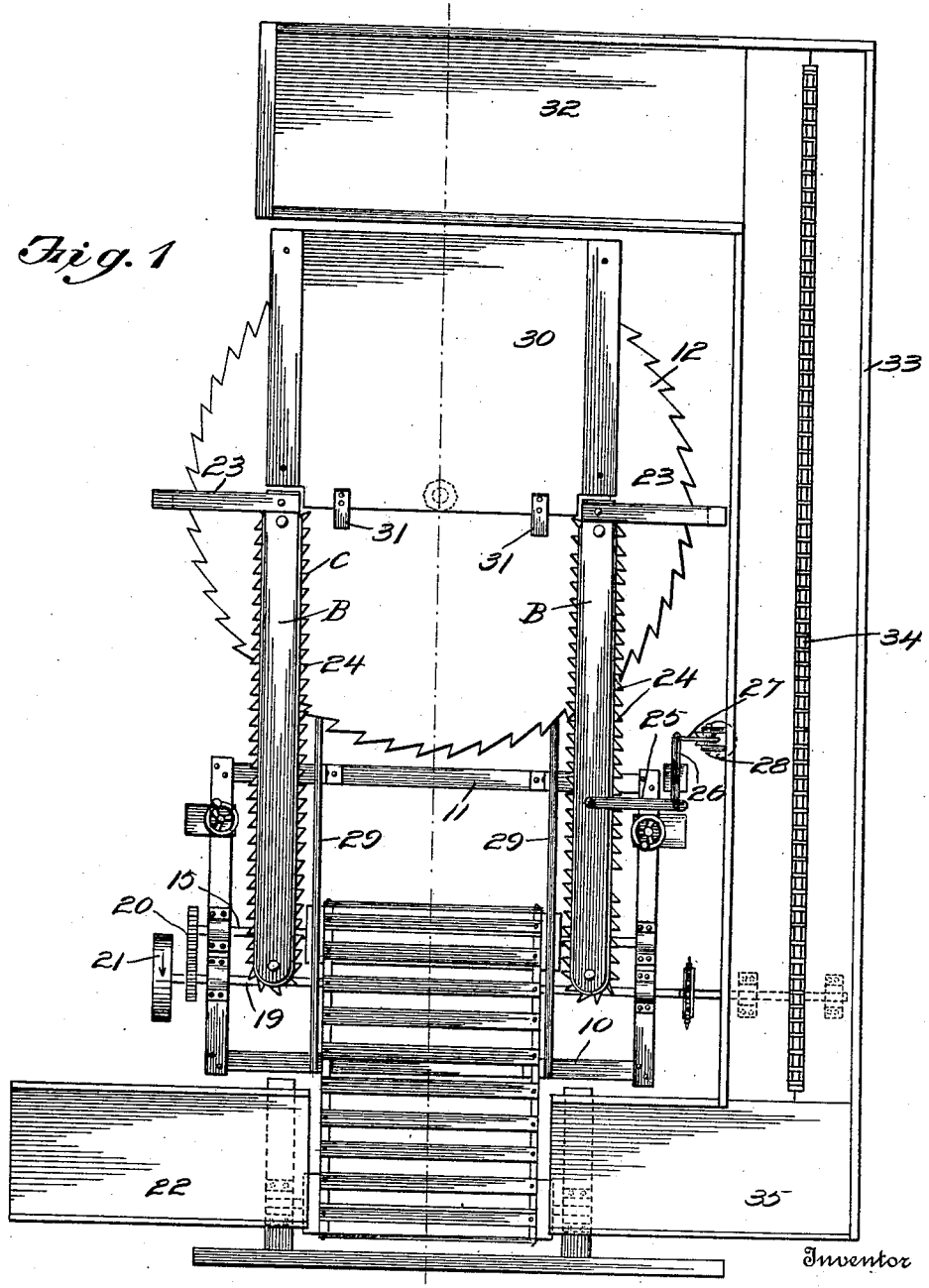

L. S. TODD.
SHINGLE SAWING MACHINE.
APPLICATION FILED SEPT. 28, 1909.

1,000,210.

Patented Aug. 8, 1911.
2 SHEETS—SHEET 1.

Witnesses
W. G. Jones.
Wm. T. Bagger.

Inventor
Leon S. Todd
By Victor J. Evans
Attorney

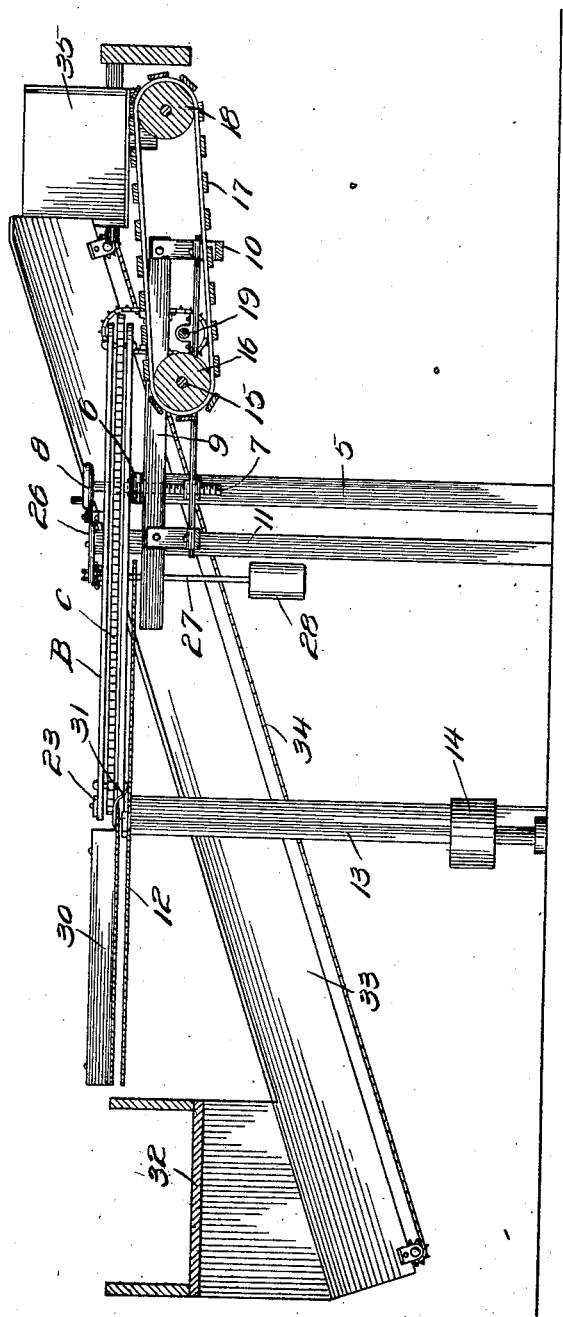

UNITED STATES PATENT OFFICE.

LEON S. TODD, OF SANDROCK, WISCONSIN.

SHINGLE-SAWING MACHINE.

1,000,210.  Specification of Letters Patent.  Patented Aug. 8, 1911.

Application filed September 28, 1909. Serial No. 519,941.

*To all whom it may concern:*

Be it known that I, LEON S. TODD, a citizen of the United States, residing at Sandrock, in the county of Iron and State of Wisconsin, have invented new and useful Improvements in Shingle-Sawing Machines, of which the following is a specification.

This invention relates to shingle sawing machines; and it has particular reference to the feed mechanism for this class of machines.

The invention has for its object to provide a shingle sawing machine with a continuous feed mechanism serving to feed the shingle blocks successively to the saw, to receive the blocks as they are discharged from the saw table, and to return them successively to the feed end of the machine where they are again fed in proper order until the blocks are exhausted.

Further objects of the invention are to simplify and improve the construction and operation of this class of devices.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention, may be resorted to when desired.

In the drawings: Figure 1 is a top plan view of a shingle sawing machine constructed in accordance with the invention. Fig. 2 is a vertical sectional elevation of the same.

Corresponding parts in both figures are denoted by like characters of reference.

The frame of the machine includes uprights 5 having brackets 6 wherein adjusting screws 7 having hand wheels 8 are mounted for the purpose of effecting vertical adjustment of the feed table which includes the side members 9 with which the adjusting screws have threaded engagement, said side members being connected by the front and rear cross bars 10 and 11. The saw 12 is mounted upon an arbor 13 which may be driven from any suitable source of power, said arbor being equipped with a band wheel 14. By vertically adjusting the feed table the thickness of the shingle to be cut may be determined and by tilting the feed table to one side, it is obvious that the taper of the shingle may be determined.

The feed table is provided with bearings for a shaft 15 carrying a roller 16 which supports one end of an endless carrier 17, the opposite end of which is supported upon a roller 18 mounted for rotation in the frame of the machine. The shaft 15 derives motion from a countershaft 19 which may likewise be supported in suitable bearings upon the side bars of the feed table and with which it is connected by gearing 20. The shaft 19 has been shown equipped with a band wheel 21 for the purpose of receiving motion from the source of power; it will be understood in this connection that the vertical movement caused by adjustment of the feed table will be so slight as not to interfere with the operativeness of an ordinary belt or band transmission.

Supported upon the frame of the machine adjacent to one side of the carrier 17 is a block table 22 from which the shingle blocks are initially fed onto the carrier 17. The frame of the machine includes brackets 23 adjacent to the upper face of the saw, and pivotally connected with said brackets are frames B provided adjacent to their ends with supporting means for endless carriers C having sharp pointed teeth 24 adapted to engage the ends of the shingle blocks which are thereby fed to the saw. One of the frames B is connected by a link 25 with a suitably supported lever 26 the opposite end of which is connected with one end of a suitably guided flexible member 27, the other end of which carries a counterweight 28 by the action of which the free end of the frame B will be carried in the direction of the opposite frame B, thus causing the teeth 24 of the carriers C to engage the ends of the shingle blocks which will be hugged between the frames, and thus be fed to the saw. Guide bars or rails 29 are provided for the purpose of supporting the shingle blocks while they are being advanced to the saw.

Supported by the frame of the machine directly above the rear half of the saw is a discharge table 30 provided at its forward edge with guide springs 31, the free ends of which rest upon the saw in engagement with the upper face of the latter. Suitably arranged directly in rear of the discharge table 30 is a chute 32 communicating at its lower end with the lower end of an elevator trough 33, the bottom of which is equipped with an endless carrier 34 and the upper end of which has a discharge chute or delivery chute 35 communicating with the endless carrier 17 at the side of the latter opposite to the block table 22. Movement may be transmitted to the endless carrier 34 from any of the moving parts of the machine or directly from the source of power in any convenient manner.

From the foregoing description taken in connection with the drawings hereunto annexed the operation and advantages of this invention will be readily understood by those skilled in the art to which it appertains. The shingle blocks which have been previously cut to the desired dimensions are initially fed to the carrier 17 over the block table 22 and are conveyed by said carrier into engagement with the carrier C. Each block, on engaging the carrier C, is pushed toward the saw by the action of the following block, and the blocks will thus be successively fed to the saw which detaches a slice constituting a shingle from the lower end of the block. The remaining upper portion of each block is pushed in a rearward direction by the following blocks and passes over the guide springs 31 onto the table 30 and from the latter into the chute 32 whence the blocks gravitate into the trough of the elevator and are conveyed by the carrier 34 to the discharge chute 35 from which they are returned to the carrier 17; the operation being repeated until the blocks are exhausted, and new blocks being provided from the table 22. When a shingle block passes from the table 30 on to the chute 32 it will slide downward upon said chute until one end of the block is engaged by the endless carrier 34. This will impart to the block a quarter-turn around the corner formed at the junction of the inner walls of the chute 32 and the carrier trough 33, and the block will now be conveyed in this position to the chute 35 at the upper end of the carrier trough. When the upper extremity of said trough is reached, the block will be tilted about the corner formed at the junction of the inner walls of the trough 33 and the chute 35, thus receiving a second quarter-turn, whereby the block is reversed end for end so that it will be properly presented to the action of the saw in such a manner that the butt end of the shingle will be cut from the end of the block opposite to that from which the butt end of the first shingle was cut, thus leveling the block.

Having thus described the invention, what is claimed is—

1. In a shingle cutting machine, a frame, a horizontally disposed circular saw supported for rotation therein, a vertically adjustable and tiltable feed table, including an endless carrier and a discharge chute at one end thereof, said chute being supported by and arranged to discharge upon said table.

2. In a shingle cutting machine, a saw, a vertically adjustable and tiltable feed table, an endless block carrier having a receiving chute adjacent to the discharge end of the machine and a discharge chute supported upon and discharging on to the feed table, and endless carriers having vertical faces arranged adjacent to the feed table, extending above the saw and arranged in proximity to the sides of the feed table.

3. In a shingle sawing machine, a frame, a circular saw supported for rotation in a horizontal plane, a feed table extending beneath the saw, an endless block carrier having one end supported by the feed table, auxiliary carriers supported adjacent to the sides of the feed table and extending above the saw, a discharge table supported above the saw, and guide springs extending from the discharge table at opposite sides of the saw arbor and contacting with the upper face of the saw to lift the shingle block from engagement therewith.

4. In a shingle sawing machine, a frame, a vertically adjustable feed table, a circular saw supported for rotation in an approximately horizontal plane, carriers for feeding blocks to the saw, a block feeding table arranged adjacent to one of the carriers, a discharge table supported above the saw and having guide springs engaging the latter, a discharge chute supported adjacent to the discharge table, an inclined elevator supported to receive material discharged over the discharge chute, and a feed chute connected with the elevator and discharging upon one of the feed carriers.

In testimony whereof I affix my signature in presence of two witnesses.

LEON S. TODD.

Witnesses:
W. A. WESCOTT,
EDW. LAIRD.